United States Patent [19]

Shen

[11] Patent Number: 5,017,319

[45] Date of Patent: May 21, 1991

[54] METHOD OF MAKING COMPOSITE PRODUCTS FROM LIGNOCELLULOSIC MATERIALS

[76] Inventor: Kuo C. Shen, 2118 Radford Court, Ottawa, Ontario, Canada, K1J 8K1

[21] Appl. No.: 524,700

[22] Filed: May 16, 1990

Related U.S. Application Data

[63] Continuation-in-part of Ser. No. 209,973, Jun. 22, 1988, abandoned, which is a continuation-in-part of Ser. No. 918,895, Oct. 15, 1986, abandoned, which is a continuation-in-part of Ser. No. 665,710, Oct. 29, 1984, abandoned.

[30] Foreign Application Priority Data

Mar. 30, 1984 [JP]  Japan .................................. 59-62946
Jun. 22, 1989 [CA]  Canada ................................. 603574

[51] Int. Cl.$^5$ ............................ B27N 3/12; B27K 3/15
[52] U.S. Cl. ...................................... 264/124; 264/83; 536/56
[58] Field of Search ................. 264/83, 115, 119, 122, 264/124; 536/56, 57

[56] References Cited

U.S. PATENT DOCUMENTS 2,984,580  5/1961  Glab .................................... 264/124
4,357,194  11/1982  Stofko ................................. 264/124

FOREIGN PATENT DOCUMENTS

497477  12/1938  United Kingdom .

Primary Examiner—Jay H. Woo
Assistant Examiner—Jeremiah F. Durkin, II
Attorney, Agent, or Firm—Parkhurst, Wendel & Rossi

[57] ABSTRACT

This invention relates to a process for converting hemicellulose of lignocellulosic material into a thermoset, water-proof adhesive. In one embodiment of the invention the thermoset, water-proof adhesive is used for converting other components of the lignocellulosic material into composite products such as panel products, reconstituted lumber and moulded articles without the use of any other adhesive binders which are an essential part of the conventional dry process of manufacturing composite products, such as wood-based particleboard, waferboard, medium density fibreboard, et cetera.

31 Claims, 2 Drawing Sheets

METHOD OF MAKING COMPOSITE PRODUCTS FROM LIGNOCELLULOSIC MATERIALS

This application is a Rule 62 CIP Application of Ser. No. 07/209,973, filed June 22, 1988, now abandoned, which in turn is a CIP Application of Ser. No. 06/918,895, filed Oct. 15, 1986, now abandoned, which in turn is a CIP Application of Ser. No. 06/665,710, filed Oct. 29, 1984, now abandoned.

BACKGROUND OF THE INVENTION

In the applicant's U.S. Pat. No. 4,627,951 there is disclosed a process for making composite products from sugar containing lignocellulosic material, specifically of annual plants of a non-woody nature, such as sugar cane bagasse, and stalks of corn, sorghum, and sunflower, et cetera. The natural sugars and other water soluble materials within the lignocellulosic material are chemically transformed, in situ, by the application of heat and pressure into an insoluble and infusible polymeric substance, acting as both a bonding and a bulking agent, to strengthen the reconstituted composite products with strong mechanical strength and superb dimensional stability.

However, this patented process is limited to lignocellulosic material containing natural free sugars and other water soluble materials and is not applicable to lignocellulosic materials, such as wood, cereal straws, rice husks, et cetera. The conventional process for making composite panel products from lignocellulosic materials relies exclusively on synthetic thermosetting resin binders for bonding. Since synthetic resins, such as phenol- and urea-formaldehyde, are expensive, they normally constitute a large portion of the production cost for the conventional panel products such as particleboard, waferboard, and medium density fiberboard. This holds specifically true in the case of agricultural residues. Because of their physical nature of agricultural residues, a relatively high content of resin binder is required for manufacturing, thus resulting in expensive panel products. The prohibitive cost of synthetic resin binders is the major reason why agricultural residues are not widely utilized today in the manufacturing of panel products, in spite of the abundance and availability of the raw materials.

In recent years a number of manufacturing processes have been developed to utilize agricultural residues around the world. However, none of the processes developed thus far have found commercial acceptance. Thus E.C. Lathrop et al. in "Hardboard from agricultural residues", Modern Plastics, p 126 (April 1951) reported the use of a combination of powdered thermosetting phenolic resin, pine gum and ground rice husks to make composite panel products. Lathrop et al found that the boards that contained as much as 15% phenolic resin were too brittle to be nailed. Moreover, the boards had a density of 1.12 (69.9 lbs. per cubic foot, pcf). This combination of 15% powdered resin and high density made the product too expensive to compete with existing products, and the brittleness of the board placed a severe limitation on its use.

The use of a specially formulated phenolic resin for bonding rice husks has been reported by R. C. Vasisshth in the U.S. Pat. No. 3,850,667, dated Nov. 26, 1974. According to VAsisshth, rice husk boards can be made with 8 to 10 percent of a water immiscible, caustic free, thermosetting phenol-formaldehyde resin and pretreated rice husks. In this process, a pretreatment is essential in order to break up the rice husk pods into individual leaves, to remove loosely bonded surface material and to screen out fine particles. It is claimed that the inclusion of fine materials generated from the pretreatment would not only increase the resin consumption, but would also introduce some undesirable effects on the properties of the board.

More recently, "New opportunities in manufacturing conventional particleboard using isocyanate binders" reported by G. W. Ball (Proceeding—Washington State University Particleboard Symposium. No. 15, p 266–285, 1981), teaches manufacturing rice husk boards with pretreated rice husks, using 9% of a very expensive polymeric isocyanate resin as the bonding agent. Since isocyanate resin is more expensive than conventional phenolic resin, the production cost of rice husk board is very high. The high manufacturing cost of this rice husk board prevents it from being competitive with the conventional wood-based panel products.

Present day methods of manufacturing panel products from lignocellulosic materials rely exclusively upon synthetic thermosetting resin for bonding. Synthetic resin binders are expensive because they are derived from petro-chemicals. In general, the resin binder cost constitutes a major portion of the production costs for these panel products, thus limiting the type of lignocellulosic material which may be used, particularly those usually selected from agricultural residues. In view of the high resin binder cost and the limitation on the raw material selection, a process that eliminates synthetic resin for manufacturing of composite panel products and which can be used with any lignocellulosic materials would be very attractive economically and technologically.

Since lignin is believed to be the natural binder within lignocellulose and is phenolic in nature, it has been extensively studied and researched as a binder for lignocellulosic composite products. Over the years different methods have been developed for the conversion of wood and agricultural residues into composite products such as panel and moulded products by generating and releasing the natural component of lignin within lignocellulosic materials for use as a resin binder. The most common method of releasing and reactivating lignin is by subjecting the lignocellulosic material to a drastic hydrolysis in the presence of water or acids at an elevated temperature. The hydrolysis removes the hemicellulose portion of lignocellulosic material, hence increasing the ratio of lignin to cellulose over that which is normally present in lignocellulosic materials and therefore improving bonding efficiency.

The U.S. Pat. No. 726,029 by A. Classen uses steam to treat saw dust with acid and cooks it under pressure at a temperature of 105 to 145 degrees Celsius for 30 to 60 minutes to render the hemicellulose water soluble. At the end of the cooking, the reacted mass is washed with water to remove the water solubles before drying and moulding.

Likewise, Sherrard, et al, in U.S. Pat. No. 2,513,316 cooks dry fibrous vegetable material under pressure in a digestor. The resulting material is then thoroughly washed with water to remove the acid and water soluble reaction products. The remaining material is then subjected to heat action and then ground to a powder for moulding.

Again, Schorger and Ferguson, U.S. Pat. Nos. 2,196,277, 2,247,204 and 2,283,820, teach cooking a natural lignocellulosic material with water or with added materials to render a part of the lignocellulosic material water soluble and particularly to dissolve the hemicellulose. The residual products, after extraction of the water solubles and subsequent drying, contain a larger part of the original thermoplastic resinous lignin.

U.S. Pat. No. 2,303,345 by Mason and Boehm describes a process of making tough products from lignocellulosic material. Mason and Boehm use high pressure stream to separate lignin from the lignocellulosic material for bonding, in that hemicellulose is hydrolyzed into water solubles which are removed from the treated lignocellulose before the fibers are made into hardboard. Consequently the removed water solubles are processed separately as a by-product with a trade mark of "Masonoid". In U.S. Pat. No. 2,224,135, issued to R. Boehm, "Masonid", the water solubles by-products from hardboard manufacturing, are used in making aldehydes, alcohols and organic acids. This patent also mentions that the water solubles thus obtained can be further concentrated and used as a water soluble adhesive. The use of "Masonid" as a water soluble adhesive is also taught in U.S. Pat. Nos. 2,643,953 and 2,716,613, issued to W. Schoel in 1949 and 1950 respectively. In these patents, it is stated that while these water solubles have adhesive properties, it has been found that they are not entirely satisfactory for use as an adhesive. One reason given is that these water solubles are undesirably hygroscopic and therefore, the bond formed by them in adhesive application is somewhat unstable. Under high humidity the adhesive bond formed by these water solubles absorbs moisture from the air, thereby weakening the adhesive bond, whereas under low humidity, the adhesive bond formed by these water solubles loses moisture and also weakens. Upon absorbing moisture, the adhesive bond formed by these water solubles tends to liquefy, while moisture loss tends to harden the board so that is approaches a state of brittleness (U.S. Pat. No. 2,643,953, Col. 1, Lines, 25-35).

Boehm and Schoel were not aware that these water solubles are thermosetting and capable of being used as a water-proof adhesive if proper processing application is followed. Instead, according to Boehm and Schoel patents the "Masonoid" may be used only as a water-soluble adhesive. Since they did not recognize the bonding nature of the water soluble materials, their patents did not teach thermosetting in their respective processes and the resulting bond which is not thermoset, is therefore not water-proof and has only limited commercial application.

The lack of appreciation and understanding of the potential of both Boehm and Schoel that the water solubles from hemicellulose hydrolyzation are capable of being thermoset into a water-proof adhesive bond, which is physically and chemically stable and resistant to boiling water, may be attributed to the logical development of the Masonite process in that the natural lignin is used as a binder, not the water soluble materials, which are removed as "Masonoid" in the Masonite process. The removal of water solubles is a key feature of Masonite process for making board products.

A similar Masonite process is taught in U.K. Patent 497,477 issued to W. W. Triggs in 1938, using steam at a temperature in the range from 216 to 285 degree Celsius with a time range from 12 seconds to 30 minutes to treat the lignocellulosic material for moulded products. Again, Triggs relies on the lignin for bonding and specifies the removal of water solubles generated during the steam treatment in order to obtain a high quality product.

All the processes mentioned above use lignin as a binder and remove the water solubles during the processes; therefore, requiring an enormous amount of water for processing. The commercial use of the Masonite process, which consumes a particularly large quantity of water has caused serious water pollution as well as other environmental concerns. This is one of the main reasons for the decline of the use of the Masonite process for making headboard since World War II. Today there are only a few remaining Masonite plants operating around the world. The only Masonite plant built in Canada was closed down in 1985.

Glab describes in 16 U.S. Pat. Nos. (2,706,160 the first and 3,252,815 the latest) the treatment of lignocellulosic material with high temperature steam for long duration in the presence of a chemical reactant capable of splitting at least a portion of lignin, which is used as a thermoplastic binder. In the examples cited in the Glab patents, steam at a temperature in the range of 218-232 degree Celsius to 254-288 degree Celsius is used with a treating time in the range between 20-30 minutes to 4-5 minutes. During this severe steam treatment, not only are the water solubles from hemicellulose hydrolysis inevitably further transformed by polymerization into a high molecular weight product, which is retained and used as a plasticiser in moulding operation, but the process also purposely reduces the alpha cellulose in molecular size to prevent swelling of moulded products (U.S. Pat. No. 2,984,580, Col. 1, Lines 34-38). In contrast to Classen, Sherrard, Schorger, Mason, Boehm and Triggs, all of whom remove water solubles from hemicellulose hydrolysis in their processes, Glab claims that the full utilization of lignocellulosic material is made by retaining the polymerized water solubles from hemicellulose as a plasticizer in the moulding operation, while the catalyzed lignin is used as a binder. Glab also claims that the flow of the mouldable material is improved by his process and a short time is required if a plasticizer is added (U.S. Pat. No. 2,984,578, Col. 4, Lines 20-23). Glab identifies and states that the preferred plasticizers are water, furfural, anile and phenol in a preferred quantity between 2-20%. Glab, like Classen, Sherrard, Schorger, Mason, Boehm and Triggs, was not aware, as the applicant has found, that the water soluble decomposition material from hemicellulose hydrolysis carried out in a mild steam treatment can be used as a thermosetting water-proof adhesive binder. Instead, Glab used very high steam temperature in combination with a long steaming duration and in the presence of a chemical reactant to break down lignin and alpha cellulose. In his process, Glab inevitably and unintentionally over cooked the hemicellulose and destroyed it beyond use as a binder. Glab polymerized, thermoset and converted the water solubles derived from hemicellulose decomposition and hydrolysis to high molecular weight materials which, after being thermoset could be used as plasticizers for the treated lignocellulose when moulded, while lignin is made to flow and function as a binder between the comminuted lignocellulose particles (U.S. Pat. No. 2,984,580, Col. 2, Lines 1-3). The steaming conditions (the combination of temperature and time) used by Glab were much more severe than those employed by Triggs. In comparison, Triggs' treating conditions are much too harsh to result in the present invention. The comparative severity of steam treating conditions employed by Triggs, Glab and the applicant is clearly shown in FIG. 1.

All processes known to the applicant, which use natural lignin as a binder, have one unique characteristic in that the final lignocellulosic moulding product is very dense and heavy. For any structural application, the specific gravity of the moulded products is always in the range of 1.0 to 1.4 (62.4 to 87.4 pcf). This is consistent with the use of lignin as a binder, resulting from the required very high moulding pressure which is necessary to make the lignin flow and bind. Furthermore, the severe treatment by high steam temperature for a long time in the known processes has also caused damage to the structural integrity of cellulose with a much lower degree of polymerization (D.P), particularly in the case of Glab, who specifies the controlled degradation so that the alpha cellulose is reduced in molecular size sufficiently to prevent swelling of the moulded products (U.S. Pat. No. 2,984,580, Col. 1, Lines 35-37). The damaged cellulose fiber, i.e. that with the lowered D.P., being the only structural component the moulded products has to rely on for the high density to compensate for the physical weakness imparted to the product, caused by the severe treatment. Thus high density products produced by these known processes have limited uses.

SUMMARY OF THE INVENTION

According to the present invention there is provided a process for converting hemicellulose of lignocellulosic material into a thermoset, water-proof adhesive, comprising:

(a) bringing lignocellulosic material, in divided form and containing at least 10 percent hemicellulose, rapidly into contact with high pressure steam at a temperature T (°C.) preferably in the range 160° C. to 260° C.

(b) maintaining the lignocellulosic material in contact with the high pressure steam only for a time t (S) seconds in the range preferably according to formula T (°C.)=306.4−35.7 $\text{Log}_{10}\text{t(S)} \pm 15$, whereby the temperature is high enough to release the hemicellulose, does not exceed the temperature of carbonization thereof, and, in combination with the limited treatment time t (S) is only capable of non-catalytic decomposition and hydrolyzation of hemicellulose into unpolymerized, water soluble resin material selected from the group consisting of pentose and hexose sugars, sugar polymers, dehydrated carbohydrates, furfural products, organic acids and other decomposition products, with negligible degradation of cellulose having taken place, (c) heating and pressing the water soluble resin material thus produced in a concentrated form, against a surface to be adhered thereto, at a temperature preferably of at least 160° C. and for a sufficient time and pressure to polymerize, crosslink and thermoset this material into a water-proof adhesive adhering to the surface.

In some embodiments of the present invention, (d) the lignocellulosic material, alone or in combination with other lignocellulosic material, in particle, fiber or flake form and containing the unpolymerized, water soluble resin material from step (b) is concentrated, as soon as possible, by being dried to a low moisture content to prevent fermentation of the water soluble resin, then (e) the dried lignocellulosic material, alone or in combination with other lignocellulosic material is formed into a mat and then (f) the mat is pressed in step (c) at a temperature in the range 160° C. to 250° C. to avoid charring the mat, and at a pressure and time sufficient, to first polymerize the said water soluble resin into the said crosslinked polymeric substance, and thermoset the thus formed polymeric material into said water-proof adhesive, thereby bonding and bulking in situ the other components of the lignocellulosic material as the said surface to be adhered to and forming a bonded, composite product.

In other embodiments of the present invention the lignin portion of the lignocellulosic material is also decomposed and hydrolyzed into low molecular weight lignin and lignin products.

The hydrolyzed lignocellulosic materials may contain less than 30 percent, by weight, of low molecular weight water solubles selected from the group consisting of sugars, sugar polymers, dehydrated carbohydrates, furfural products, organic acids, lignin, lignin products and other minor decomposition products.

The lignocellulosic material may be brought into contact with the high pressure steam in a pressure vessel and, after maintaining the lignocellulosic material in contact with the high pressure steam for the time t (S) seconds, the steam pressure in the pressure vessel may be released to atmospheric pressure with an explosive discharge to render the lignocellulosic material in fibrous and particulate form.

The lignocellulosic material may be brought into contact with the high pressure steam in a pressure vessel and, after maintaining the lignocellulosic material in contact with the high pressure steam for the time t (S) seconds, the steam pressure in the pressure vessel may be gradually brought to atmospheric pressure to retain the lignocellulosic material, other than the hemicellulose and lignin, substantially in the original form.

The lignocellulosic material may be brought into contact with the high pressure steam in a pressure vessel and, the steam pressure maintained within the pressurized vessel after the pressure vessel has been opened so that the steam treated lignocellulosic material is continuously extruded from the pressure vessel to atmospheric pressure in the time t (S) seconds.

The lignocellulosic material, after the high pressure steam treatment, may be dried to a moisture content of less than 18 percent to prevent fermentation and to accelerate the thermoset during step (f).

The lignocellulosic material may be derived from at least one species and one substance selected from the group consisting of stem, stalk, shrub, foliage, bark, root, shell, pot, nut, husk, fibers, straw, vine, grass, bamboo, reed and wood.

(e) may be converted to, particles, fibers, strands, flakes or chips.

A portion of the lignocellulosic material may be removed before the lignocellulosic material is rapidly brought into contact with the high pressure steam in step (a).

The treated lignocellulosic material of step (b) may be mixed with lignocellulosic material of the same or different species and in the same or different forms before step (c).

The lignocellulosic material of step (b) may be expressed, or treated with hot water, to extract unpolymerized, water soluble resin material therefrom as an aqueous solution, water is then evaporated from the aqueous solution to concentrate the water soluble resin material is then used in step (c).

The water may be evaporated from the aqueous solution under vacuum.

The applicant has found that, surprisingly and contrary to the teachings of the prior art, the water solubles derived from a controlled hydrolysis of hemicellulose not only are not detrimental to bonding the other components of the lignocellulosic material, but rather, can be extracted and used as a thermoset water-proof resin binder or used directly to provide a bonding and bulking effect "in situ" for the other components of the lignocellulosic materials. The use of high steam temperature in combination with a much shorter steaming time than has previously been proposed allows the decomposition of hemicellulose while avoiding damage of cellulose fibers which act as the main structural component of reconstituted products in the present invention.

The present invention is based on the fact that free sugars and other related chemicals can be generated from hemicellulose in any lignocellulosic material containing at least 10% natural hemicellulose and, in some embodiments of the present invention, utilized as a thermosetting adhesive in reconstituted composite products from the lignocellulosic material, thus eliminating the need of synthetic resin binders. It is well known that lignocellulosic materials comprise three main components; cellulose, hemicellulose and lignin. Chemically, cellulose, which is the main structural component of all plant cell walls and which constitutes about 40 to 60 percent of lignocellulosic materials is a linear polysaccharide built up from anhydro glucose units having the general crystalline formula $(C_6H_{10}O_5)_n$. Cellulose is crystalline in nature. Hemicellulose is the name given to the non-cellulosic low molecular weight polysaccharides, associated in plant tissues with cellulose in the lignocellulosic materials. Hemicellulose which constitutes about 20 to 35% of the lignocellulosic material may be repeated by the general formula $(C_5H_8O_4)_{n1} \cdot (C_6H_{10}O_5)_{n2}$, representing 5 and 6 carbon sugars such as pentosan and hexosan. The third main component is lignin which is the natural binder within the lignocellulose and constitutes about 20 to 30% of the lignocellulosic materials. The precursors of lignin and its formation in lignocellulosic material are still not completely understood, although recently, considerable progress has been made in understanding these things. Today lignin is generally accepted to be a polymeric material made up of phenolpropane units.

Since hemicellulose is, in situ, largely amorphous in nature, it has great accessibility to water. Therefore, hemicellulose is decomposed about 100 times faster than cellulose, and therefore, hemicellulose may be hydrolyzed selectively without the degradation of the cellulose. The general hydrolysis reaction is: $(C_5H_8O_4)_{n1} \cdot (C_6H_{10}O_5)_{n2} + (n_1+n_2)$ $H_2O \rightarrow n_1 C_5H_{10}O_5 + n_2 C_6H_{12}O_6$, yielding 5 and 6 carbon sugars. These free sugars are reactive and can be decomposed under heat and pressure in the presence of other decomposition products into numerous chemicals and chemical intermediates which the applicant has found can be further transformed and thermoset into a polymeric substance, by the application of heat and pressure in a moulding operation, to provide in some instances both bonding and bulking functions in lignocellulosic material. This produces reconstituted composite products with good mechanical strength and excellent dimensional stability.

It is believed that bonding in the present invention is created by the chemical transformation of monomeric and oligomeric sugars and other decomposition products from hemicellulose hydrolysis. The chemical reactions involved in the present bonding system have not been fully understood but it has been found to work satisfactorily and the applicant does not wish to be bound to any theory. To the best of the applicant knowledge, the present invention represents a substantial advance in the art and no one has previously recognized that the water soluble material from hemicellulose decomposition can be used as a thermosetting resin binder and that a satisfactory water-proof bond of superior grade can be achieved in this way. However; theoretically, several reaction systems may be involved separately or simultaneously during the transformation of sugars to the production of furfural.

It is well known that furfural may be produced from a member of plant material containing pentosans. In the case of hardwood hemicellulose, a major portion being xylan, on acid hydrolysis the xylan yields xylose, which subsequently loses three water molecules to form furfural. Hence, we can formulate the simplified equation:

In fact it is much more complex and to date no completely satisfactory explanation has been given for the intermediate compounds formed before the furfural is actually produced. One hypothesis is as follows and suggests a 3-stage reaction:

It may be postulated that in the present invention these intermediate compounds or their decomposition products would crosslink and thermoset, in situ, under heat and pressure, and particularly in the acidic environment and in the presence of other decomposition products from hemicellulose hydrolysis, into a polymeric substance, which in some embodiments of the present invention adhesively bonds the lignocellulosic material together to yield the reconstituted composite product. On the other hand, furfural products may condense with other decomposition products to yield a polymeric bonding substance.

PREFERRED EMBODIMENTS OF THE INVENTION

In the accompanying drawings, which illustrate, by way of example, embodiments of the present invention.

The invention process comprises two major parts of operation. The first part is to decompose and hydrolyze the hemicellulose portion of the lignocellulosic materials in a controlled manner by high temperature steam and convert it into water solubles containing free sugars, sugar polymers, dehydrated carbohydrates, furfural products, organic acids and other decomposition products, which can be extracted and used as a thermoset, water-proof adhesive. The second part of the process is to chemically transform and thermoset all the decomposition products from hemicellulose hydrolysis into a water-proof adhesive adhering to a surface by applying heat and pressure in a moulding operation. In some embodiments of the present invention the thermoset, water-proof adhesive provides both bonding and bulking, in situ, with the other components of the lignocellulosic material, thereby converting the lignocellulosic material into a reconstituted composite product.

The applicant has found that since hemicellulose can be selectively decomposed and hydrolyzed at a much faster rate than cellulose, it is possible according to one aspect of the present invention to convert substantially all of the hemicellulose into decomposition products for bonding and bulking without destroying the cellulose which remains intact as the structural component and, along with lignin products, acts as a filler in the reconstituted composite products. To achieve this, a high pressure steam treating method or so-called autohydrolysis has been found according to the present invention to be very satisfactory. During the high pressure steaming of lignocellulosic material, hemicellulose first undergoes decomposition reaction. First, acetic acid is formed by cleavage of acetyl side chains and the weak acidic environment thus created is sufficient to further promote hydrolysis of hemicellulose. The depolymerization reaction is believed to be a sequential reaction. During the initial phase of the reaction process, random attack by acid in hemicellulose chains produces oligomers of varying degrees of polymerization. The oligomers are hydrolyzed to monomers which are further degraded to sugar polymers, dehydrated carbohydrates, furfural, organic acids and other decomposition products, which are an important part of the present invention because they are used as a thermosetting water-proof adhesive binder. Simultaneously, the lignin portion of lignocellulosic materials is also decomposed and hydrolyzed to low molecular weight lignin and lignin products which remain in the lignocellulosic material as a filler for the composite product. Only the cellulose remains relatively unchanged but with a lowered degree of polymerization (D.P.) and is used as the sole structural component of the composite products. The steam treated lignocellulosic material normally contains less than 30% water solubles which include sugars, sugar polymers, dehydrated carbohydrates, furfural products, organic acids, lignin and lignin products and other decomposition products. The free sugars, sugar polymers, dehydrated carbohydrates, furfural products, organic acids and other minor decomposition products are essential parts of the present invention. When chemically transformed under heat and pressure, they polymerize, crosslink and thermoset, in situ, into a polymeric substance acting as both a bonding and bulking agent for the reconstituted products from the steam treated lignocellulosic materials. In this connection, chemically digested fibers from which the hemicellulose has been substantially removed are not suitable for treatment according to the present invention. At least 10 percent of the hemicellulose is preferably retained in the lignocellulosic material. In contrast, the Mason patent previously referred to states that lignocellulosic material in which lignin has been removed, such as chemical pulp, is not compatible with his process, while the Glab patents previously referred to specifies that partially hydrolyzed lignocellulosic material or pulped lignocellulose can be used for his invention.

The conventional process for making panel products from lignocellulosic materials requires an amount of 8 to 12% by weight of synthetic resin binder. Hemicellulose normally constitutes about 20 to 35% percent of the lignocellulosic materials which is enough to generate free sugars and other decomposition products for bonding. The amount of free sugars and other decomposition products which can be generated from the lignocellulosic material is mainly dependent upon the nature of the raw materials and the degree of steaming treatment. Normally, agricultural residues and hardwood contain more hemicellulose than do coniferous softwoods.

In order to optimize the conversion of hemicellulose, proper control of the high pressure steam treatment is an important part of the present invention. Understeaming will generate an insufficient amount of free sugars and other decomposition products for bonding, resulting in reconstituted composite products of poor quality. Similarly, over steaming, which would destroy not only the water solubles but also the cellulose, is also detrimental to the present invention. Since hemicellulose hydrolysis is a sequential reaction, under severe conditions, the free sugars and other decomposition products thus generated would further transform, polymerize and thermoset into a high molecular weight polymeric substance during hydrolysis treatment. If polymerization and thermosetting of the free sugars and other decomposition products from hemicellulose hydrolysis takes place during the steam treatment, the treated lignocellulosic material so produced would be of no use for producing the composite products according to the present invention. Because the water solubles in the treated lignocellulosic material will have already undergone polymerization and thermoset into an insoluble and polymeric substance, they can be no longer used as an adhesive binder. Furthermore, over steaming by high temperatures and extended exposure to steam, or the combination of both always caused both physical damage and chemical degradation to cellulose, which, in turn, resulted in a weak composite product.

Figure 1:
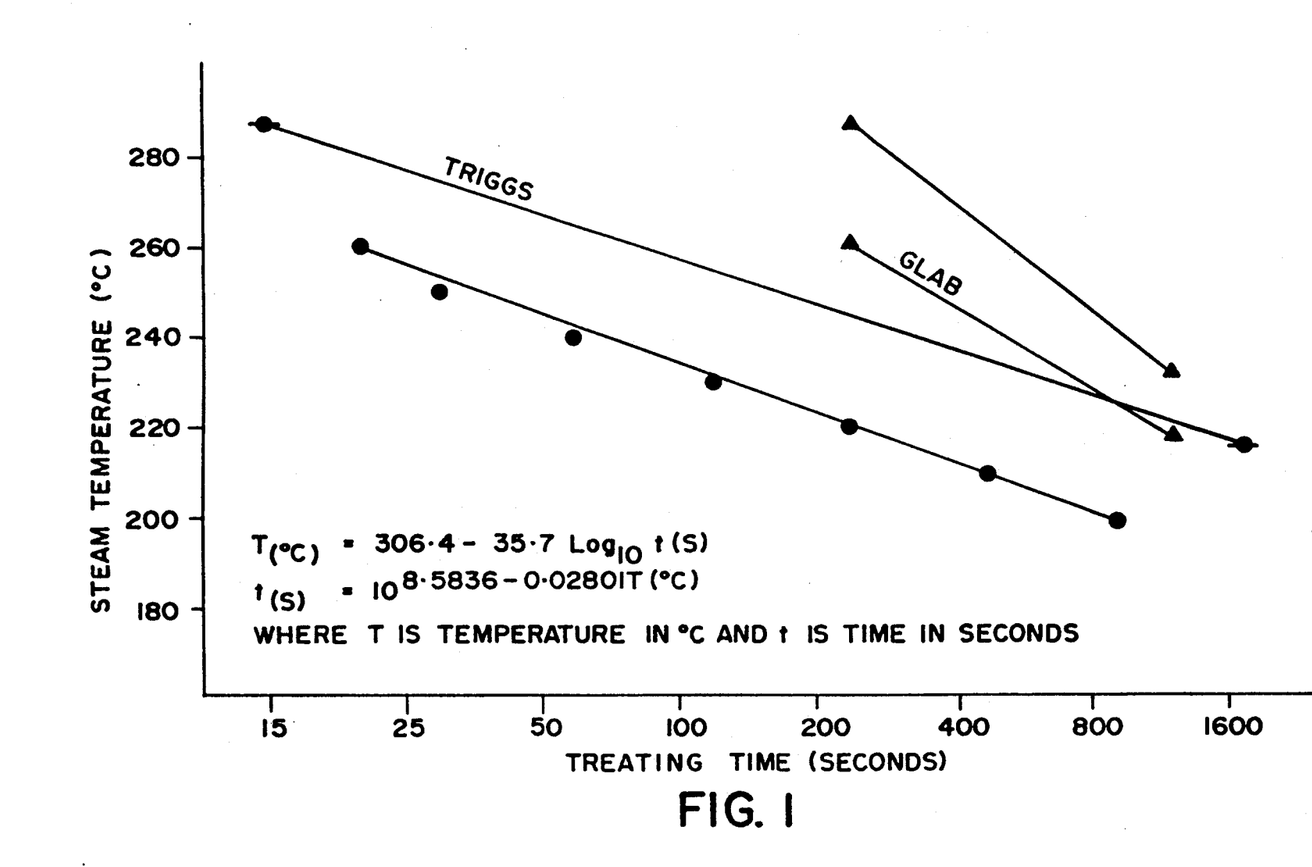
FIG. 1 is a graph showing the relationship between steaming temperature and time for the optimal hydrolysis of rice husks.

Experimental work on rice husks which contain about 20.4% pentosan shows that hemicellulose may be converted into water solubles containing pentose sugars, sugar polymers, dehydrated carbohydrates, furfural products, organic acids and other decomposition products for bonding. Table 1 demonstrates the time and steam temperature required to obtain the optimal steaming condition to produce rice husk panel products with good mechanical strength and superb dimensional stability. Based on the data listed on Table 1, a close relationship between steaming temperature and time for the optimal hydrolysis of rice husks can be constructed as shown in FIG. 1. Also based on this relationship, a mathematical formula can be deduced to indicate a reciprocal relationship between steam temperature and time as follows:

$$T(^\circ C.) = 306.4 - 35.7 \log_{10} t (s) \text{ (Temperature as a function of time)}$$
or
$$t_{(s)} = 10^{8.5836 - 0.02801 T(^\circ C.)} \text{ (Time as a function of temperature)}$$

where T is the temperature in Celsius and t is the time in seconds.

Theoretically a wide range of temperatures may be used for the present invention to obtain the optimal conditions for hemicellulose decomposition and hydrolysis, which would yield the best quality of composite products, i.e. the highest mechanical strength and dimensional stability. However, in practice, a temperature range in the order of 200 to 240 degrees C. appears to be most suitable. Within this temperature range, the time required to achieve optimal treatment for rice husks ranges from 30 seconds to about 12 minutes, depending on the temperature. This duration seems most practical for commercial operations. As mentioned before, a too short steaming time does not result in a uniform treatment, especially when larger sized lignocellulosic material is involved such as chips and large particles. The process requires a relatively long time for steam to penetrate chips thoroughly, and this penetration can not be accomplished in a short time of a few seconds, even when extremely high steam pressure is employed. On the other hand, a too low steam temperature requires an extended treatment time of hours which is not practical for commercial application. The inverse relationship between time and steam temperature is clearly shown. The higher the temperature used, the shorter the time required and vice versa. To a lesser extent, species, moisture content, shape and size of the lignocellulosic material also have a considerable effect on the temperature and time combination to achieve the optimal condition for the pretreatment.

At the end of the steam treatment, the lignocellulosic material may be collected either by a sudden release or by a gradual release of steam pressure from the pressure vessel. The sudden release of high pressure steam would explode and shred the treated material into a fibrous or a particulate mass with a high moisture content. The slow and gradual release of steam pressure enables the treated material to retain, more or less, its original shape and size. In addition, the steam treatment can be carried out continuously by a process in which the steam treated material is continuously extruded while the lignocellulosic material is being constantly pressurized in the pressure vessel. The material thus treated is light to dark brown in colour and has a moisture content ranging from less than 20% to more that 100%, depending on the initial moisture content of the lignocellulosic material, the severity of the steam treatment and the manner in which the treated material is extracted. At this stage, the water solubles in the treated lignocellulosic material may be extracted and concentrated to a thermoset, water-proof resin adhesive. Or the treated lignocellulosic material may be mixed with other lignocellulosic material and further processed into particles or fines before or after drying. Drying should be carried out immediately until a moisture content of less than 18% is reached. Otherwise, the sugars in the treated lignocellulosic material would start fermentation particularly in a humid and warm environment. If fermentation takes place, the free sugars are transformed to alcohol and then to acetic acid. Once this happens, the treated lignocellulosic material loses its bonding effect because there are no free sugars to provide the bonding. On the contrary, the treated material after drying can be stored indefinitely without any adverse effect on its bonding properties.

Here, the first part of one process according to the present invention ends with either a thermoset, water-proof resin adhesive or a dried lignocellulosic material containing a high portion of free sugars and other decomposition products from hemicellulose, which, if desired, is ready for the manufacturing of reconstituted composite products.

The second part of one process according to the present invention begins. In the form of individual fibers, particles, strands, flakes, or in forms of lumps, chunks, bundles and aggregates, the dry lignocellulosic materials are formed alone or in combination with other lignocellulosic materials into a desired mat, and then moulded under heat and pressure for a sufficient time to thermoset the binder and to consolidate the mat into a rigid article. As the steam treated material is highly plastic, it requires a relatively low unit pressure to achieve the consolidation of mat in comparison to the conventional lignocellulosic material.

During the hot moulding operation, the free sugars, sugar polymers, dehydrated carbohydrates, furfural products, organic acids, and other decomposition products transform, crosslink, polymerize, thermoset and bond, in situ, the lignocellulosic material to produce a rigid article. In addition, some of the water solubles, which are of a low molecular weight in nature and which permeate within the cell wall tissue of the cellulose fibers, are also transformed, crosslinked and thermoset to a polymeric substance, acting as a bulking agent throughout the entire moulded article. Thus, the moulded article possesses excellent mechanical strength and superb dimensional stability with a thermoset adhesive bond which is resistant to boiling water and acid attack. Furthermore, the composite products thus manufactured are free from toxic formaldehyde emissions because conventional resin binders containing formaldehyde are not used.

Another important feature of the present invention is the destruction of the epidermis of agricultural residues, such as rice husks, sugar can bagasse, cereal straws, et cetera by the steaming treatment, particularly when combined with an explosive discharge by a sudden release of steam pressure at the end of stream treatment. Because the silicate and waxy nature of the epidermis is impervious to water and hence to the adhesive bond, the destruction of the epidermis enhances the interface bonding between individual elements.

Another unique feature of this present invention is the extra benefit from the conversion of the hemicellulose. As previously stated, in its natural condition, hemicellulose is largely amorphous in structure and has great accessibility to water, making lignocellulosic materials highly hygroscopic, which result in dimensional changes. Since the treated lignocellulosic materials contain little hemicellulose, in accordance with the present invention, the reconstituted composite products are far less hygroscopic and hence, have superior dimensional stability.

Yet another advantageous feature of the present invention is the high degree of thermo-plasticity of the treated lignocellulosic material which requires far less pressure and which exhibits excellent flow characteristics during moulding operations.

It has also been discovered by the applicant that the previously hydrolyzed lignocellulosic material from which hemicellulose has been hydrolyzed and removed can be further hydrolyzed with high pressure steam to again produce low molecular weight carbohydrates of hexose sugars with minor portions of pentose sugars, sugar polymers, organic acids, hydroxymethyl furfural and other decomposition products. These water solubles, which can be extracted and processed into a concentrate in liquid and solids form, are used as a thermosetting resin adhesive for bonding lignocellulosic material and for other general purposes. Although cellulose, being crystalline in structural nature, is much more difficult to decompose and hydrolyze, and requires more severe steam treatment than hemicellulose, the yield of water solubles from cellulose is higher in quantity in comparison to hemicellulose hydrolyzation. The thermosetting resin adhesive material derived from cellulose decomposition and hydrolyzation has similar bonding characteristics and properties to those of the resin adhesive derived from hemicellulose decomposition and hydrolyzation, using the high pressure steam treatment.

Embodiments of the present invention will be described and illustrated in detail in the following examples:

EXAMPLE 1

Rice Husk Boards

This example shows the effect of steaming time and steam temperature on rice husk board. Seven batches of rice husks were treated to various steaming conditions. Dry rice husks with 8% moisture content were first packed in the pressure vessel and the vessel was rapidly filled with high pressure steam to heat the rice husks to a desired temperature for a predetermined time. At the end of steaming, the steam pressure was suddenly released and the rice husks were extracted from the vessel in a hot, moist and fibrous condition. The moisture content of the steam rice husks varied from about 40% to 60%. A total of 7 batches was treated with different temperatures (from 200 to 260 degrees C.) and times (from 20 seconds to 14 minutes). Samples were taken from each batch of the treated rice husks for pentosan determination (Tappi method - T 2230S - 78). To be pressed into boards, the steamed rice husks were immediately dried to a moisture content of about 3 to 4%.

Seven boards, each 18×18×7/16 inches, were made with a specific gravity of 1.0 (62.4 pcf). The same press condition was used for all 7 boards (press temperature 220 degrees C., press pressure 600 psi and press time 10 minutes). Test results are summarized in the following table.

TABLE 1

Pentosan analysis and physical properties of seven rice husk boards

| Treatment | | Pentosan* Obtained (%) | MOE (psi) | MOR (psi) | | IB (psi) (Internal bond) | Swelling after 2 hrs boil (%) |
|---|---|---|---|---|---|---|---|
| Temp. (deg °C.) | Time (sec) | | | Dry | boiled | | |
| 260 | 20 | 17.6 | 613 000 | 2720 | 1280 | 164 | 9.6 |
| 250 | 30 | 18.2 | 644 000 | 2660 | 1380 | 152 | 10.7 |
| 240 | 60 | 17.3 | 606 000 | 2540 | 1400 | 142 | 11.2 |
| 230 | 120 | 16.7 | 597 000 | 2520 | 1360 | 156 | 11.8 |
| 220 | 240 | 17.0 | 602 000 | 2560 | 1390 | 153 | 11.7 |
| 210 | 460 | 17.4 | 622 000 | 2670 | 1380 | 155 | 11.4 |
| 200 | 840 | 16.8 | 593 000 | 2460 | 1270 | 140 | 12.6 |

*Chemical analysis indicated that the original rice husks contained 20.4% pentosans
The mechanical strength and physical properties of the 7 rice husk boards surpassed the CAN 3-0188.3-M78 requirements for exterior grade waferboard

EXAMPLE 2

This example demonstrates the effect of optimal treating condition on the quality of medium density fiberboards (MDF) made from Aspen poplar and Lodgepole pine.

Commercial poplar and pine chips with a moisture content of about 67 to 74% were steamed separately at a temperature of 240 degree C. for 0, 30, 60, 90, 120, and 240 seconds respectively. The zero time treatment was used as a control for comparison purpose. After steaming, the chips were fed through a Sunds Defibrator to obtain fibers for the MDF study. The refining was carried out under a steam pressure of about 20 psi or about 125 degree C. steam temperature for about 3 minutes. After refining, fibers were dried to a moisture content about 4 to 5% for board making. Also samples from poplar and pine fibers were taken for water solubles and pentosan (poplar fibers only) determination. Six MDF (18×18×7/16 inch) were fabricated from both poplar and pine fibers with one pressing condition (platen temperature 220 degree C., 275 pis pressure and 10 minute press time). The density of all boards was aimed at 50-52 pcf. Test results are listed in Table 2. Water solubles for both poplar and pine fibers and pentosan for poplar only are listed in Table 2.

TABLE 2

Physical properties of MDF made from poplar and pine chips

| TREATING TIME (sec) 240° C. | DRY | | MOR (psi) BOILED | | MOE (1000 × psi) | | IB (psi) | | SWELLING 2 hr boil (%) | |
|---|---|---|---|---|---|---|---|---|---|---|
| | poplar | pine | poplar | pine | poplar | pine | poplar | pine | poplar | pine |
| 0 | 1630 | 890 | DEL | DEL | 262 | 197 | 22 | 11 | DEL | DEL |
| 30 | 2780 | 1730 | 1120 | DEL | 456 | 422 | 107 | 72 | 11.5 | DEL |
| 60 | 3250 | 2940 | 1580 | 1470 | 527 | 516 | 123 | 98 | 10.1 | 11.6 |
| 90 | 3030 | 3120 | 1620 | 1540 | 538 | 556 | 112 | 125 | 8.6 | 8.2 |
| 120 | 2480 | 2670 | 1330 | 1650 | 489 | 513 | 82 | 114 | 5.8 | 6.7 |

TABLE 2-continued

Physical properties of MDF made from poplar and pine chips

| TREATING TIME (sec) 240° C. | DRY | | MOR (psi) BOILED | | MOE (1000 × psi) | | IB (psi) | | SWELLING 2 hr boil (%) | |
|---|---|---|---|---|---|---|---|---|---|---|
| | poplar | pine | poplar | pine | poplar | pine | poplar | pine | poplar | pine |
| 240 | 910 | 1210 | 620 | 870 | 214 | 305 | 44 | 56 | 4.6 | 5.4 |

TABLE 3

Water solubles and pentosan determination on treated fibres

| TREATING TIME (sec) at 240° C. | WATER SOLUBLES (% of O.D. Fibre wt) | | PENTOSAN (% of O.D. fibre wt) |
|---|---|---|---|
| | poplar | pine | poplar |
| 0 | 3.7 | 2.6 | 1.17 |
| 30 | 21.2 | 15.3 | 12.26 |
| 60 | 25.1 | 23.6 | 13.93 |
| 90 | 22.4 | 24.5 | 11.87 |
| 120 | 18.8 | 20.2 | 8.76 |
| 240 | 14.6 | 17.6 | 5.42 |

Figure 2:
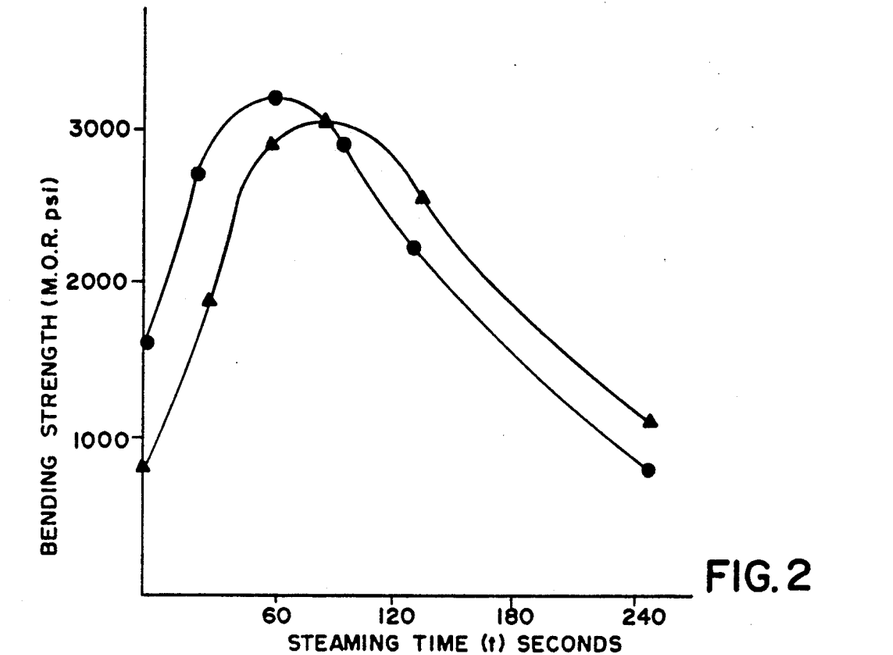
FIG. 2 is a graph showing the relationship between bending strength of MDF and steaming time for poplar and pine chips.

FIG. 2 is based on the data presented in Table 2 of Example 2, in order to illustrate the effect of steaming condition on the physical properties of medium density fiberboards made from poplar and pine chips, which were steam treated at 240 degrees C. for 0, 30, 60, 90, 120 and 240 seconds respectively. In FIG. 2, the bending strength of the reconstituted panel boards is plotted against the steaming time and ● designates poplar, and ▲ designates pine.

Figure 3:
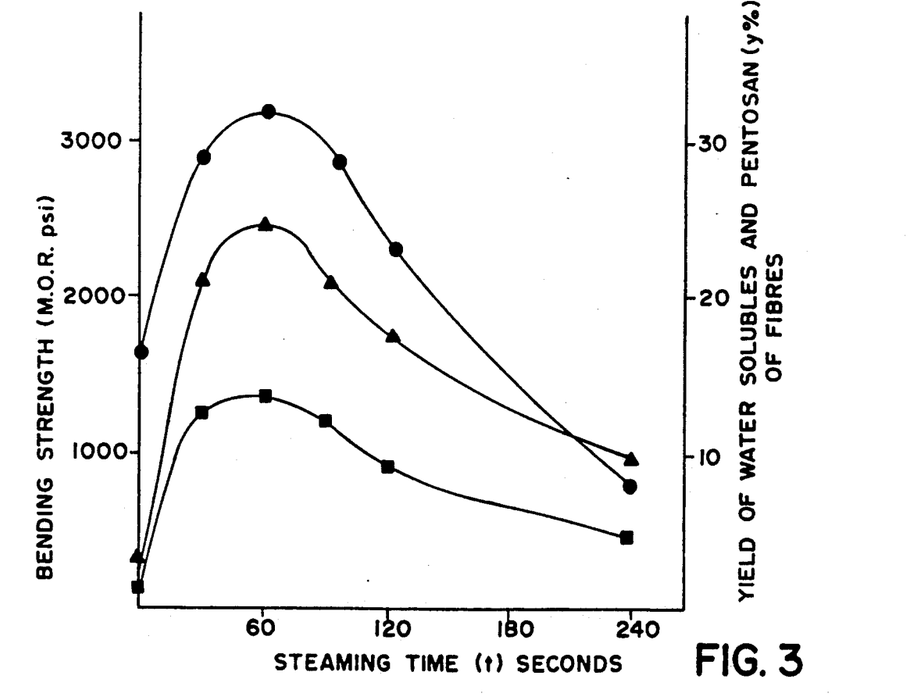
FIG. 3 is a graph showing the relationship between bending strength of MDF and treating time with regard to the water solubles and pentosan for poplar chips.

It is clear from FIG. 2 that both poplar and pine boards followed similar patterns indicating a close correlation between bending strength and steaming time. As steaming time increases from the initial stage, bending strength also increases sharply until it reaches to the peaks and then abruptly decreases in bending strength as steaming time is extended. The bending strength reaches its peaks at 60 and 90 seconds of steaming for poplar and pine respectively. This also confirms that there is a species difference in reaction to steaming condition: ie. pine wood requires longer treating time to reach its optimal condition than poplar when steam temperature of 240° C. is used. As it is known that hardwood differs from softwood in both physical and chemical properties, particularly with regard to the nature of hemicellulose. However, both species react very well to a broad range of treating time within which a optimal treating time can be selected to yield a MDF (medium density fiberboard) which would meet Canadian Standards: CAN.3-0188. 3-M82. Sinc the water solubles or pentosan yields are closely associated with the treating condition and the final quality of boards, FIG. 3 is constructed to demonstrate their relationships. Again, at the initial stage, bending strength and the yields of water solubles and pentosan increase rapidly at an almost equal rate. However, after reaching their peaks both the bending strength and the yields of water solubles and pentosan start to decrease, but at two distinct rates. The reduction of bending strength is more rapid than that of the water solubles or pentosan. The water solubles decrease from 25.1% at 60 seconds treating time to 14.6% at 240 seconds, a reduction of 72%, and the pentosan reduction from 13.93% to 5.42%, a reduction of 157%, while the bending strength is reduced from 3200 psi to 910 psi, correspondingly, an enormous reduction of 252%. This extremely high decrease in bending strength appears to result from a combination of a lower yield of the water solubles or pentosan and the damaged cellulose fibers. The reduction of water solubles or pentosan is caused by the extended steaming time which inevitably polymerizes and thermosets part of water solubles into an insoluble polymeric substance. As mentioned before, the polymerized substance of high molecular weight is no longer an adhesive binder, hence incapable of bonding because it had already thermoset and cured. The damage of the cellulose during auto-hydrolysis is bound to take place and the extent of damage is directly related to the severity of the hydrolysis. The most damage to cellulose during auto-hydrolysis is the reduction of D.P. (degree of Polymerization). A cellulose fiber with lower D.P. is weak and brittle. In FIG. 3, the bending strength and yields of water solubles and pentosan are plotted against the steaming time for, poplar for different steaming time and ● designates the bending strength of the reconstituted panel boards, ▲ designates the yield of the water solubles, and ■ designates the yield of pentosan. As shown in FIGS. 2 and 3, the damaged cellulose fibers are certainly responsible, at least partially, for the significant reduction in bending strength of the MDF. It is important, as the present invention calls for, that the decomposition and hydrolysis of the hemicellulose should be carried out in a manner that degradation of cellulose should be minimized or avoided, if possible at all.

EXAMPLE 3

Wheat straws were cut into 3 to 4 inch lengths and air dried to a moisture content of 8 to 10%. The wheat straws were given a steam treatment at 240 degrees C. for 35 seconds. The pressure was instantly released. The treated mass had a moisture content of about 60% and was dried to a moisture content of 4 to 5%. The dried straws were shredded to a loose fibrous state and then formed into a mat. The mat was hot pressed at 220 degrees C. and at a pressure of 300 psi for 10 minutes. The board 18×18×7/16 inches having a specific gravity of 0.75 (47 pcf). Tests of the board indicated as follows.

MOR: 2400 psi, wet MOR: 1100 psi IB: 86 psi
MOE: 460 000 psi
Swelling after 2 hrs boiling: 8.6%

EXAMPLE 4

Aspen Particleboard

This example shows the combination of steam treated lignocellulosic material with other untreated lignocellulosic material for making board. Aspen chips were treated with high pressure steam at 240 degrees for 70 seconds and the pressure was then instantly released. The pulpy mass contained a high proportion of sugars and water soluble materials. After drying, this material was ground into fine powdery particles and passed through a 100 mesh screen. A 3-layer board was made with 40%, by weight, of the fine powdery particles on the surface layers. The core, which composed 60% by weight of the board, consisted of 70% of fine powdery particles and 30% aspen wood splinters. The aspen wood splinters (passed through a ¼ inch screen) were not treated with steam. The mat was hot pressed at 210 degrees C. with a pressure of 200 psi for 8 minutes to yield a panel of 18×18×7/16 inches with a specific gravity of 0.78 (49 pcf). Test results indicated the following properties:

MOR: 2540 psi, wet MOR: 1420 psi
IB: 78 psi
MOE: 590 000 psi
Swelling after 2 hrs boiling: 7.5%

This panel had a very smooth and tight surface, being of equal or superior quality to that of the wet process hard board made conventionally. All the properties surpassed the CAN. 3-0188.2-M78 requirements for exterior grade waferboard.

EXAMPLE 5

Mixed Species Board

This example shows and application of the steam treatment to a mixture of different lignocellulosic materials for board making. Equal parts, by bone dry weight, of peanut shell, rice husk and planer shavings of spruce wood were mixed and treated at a steam temperature of 240 degrees C. for 45 seconds with an explosive discharge at the end of stem treatment. The treated material was dried to 3% moisture content and a mat was formed. The mat was then hot pressed at a temperature of 230 degree C. for 10 minutes with a pressure of 250 psi to yield a 18×18×7/16 inch panel board. The specific gravity of the board was 0.80 (50 pcf). Test results indicate the following properties:

MOR: 2200 psi, wet MOR: 1090 psi
IB: 86 psi
MOE: 497 000 psi
Swelling after 2 hrs boiling: 8.6%

EXAMPLE 6

Poplar Waferboard

This example demonstrates the high pressure steam treatment without the explosive release of the pressure at the end of the treatment. This particular treatment enables the treated lignocellulosic material to retain its shape and size. Poplar wafers of 1.5+2+0.03 inches were treated with steam at a temperature of 230 degrees C. for about 90 seconds. The steam pressure was then gradually released to atmospheric pressure (about 1.5 minutes). The treated wafers contained about 52% moisture content and were dried to 4% for board making. A panel of 18×18×7/16 was made to a specific gravity of 0.70 (44 pcf). The platen temperature was 220 degrees C.; press time 8 minutes; pressure 250 psi. Test results are summarized as follows:

MOR: 2480 psi, wet MOR: 1350 psi
IB: 68 psi
MOE: 648 000 psi
Swelling after 2 hrs boiling: 16.5%

This board would pass the CAN 3-0188.2M78 requirements for exterior grade waferboard.

EXAMPLE 7

Logging Residue Board

This example shows the possibility of converting logging residues into panel products with no addition of adhesive binders. A white spruce tree top which consisted of about 40% wood, 40% foliage, and 20% bark was chipped to pass a ¼ inch screen. The chips contained about 53% moisture content and showed sign of fungus attack. The chips were packed in a pressure vessel to receive a steam treatment at 235 degrees C. for 60 seconds. The pressure was instantly released at the end of the treatment with an explosive discharge to produce fibrous material. The fibrous material had a moisture content of 116% and a sugar content of 15.5%. This material was dried to a low moisture content of 3% for making boards. One board of 18×18×7/16 inches was made to a specific gravity of 0.84 (52 pcf), using a press temperature of 220 deg. C., a pressure of 250 psi and a press time of 12 minutes. Test results are listed below:

MOR: 1870 psi, wet MOR: 1160 psi
IB: 86 psi
MOE: 448 000 psi
Swelling after 2 hrs boiling: 14.5%

EXAMPLE 8

Effect of an Acidic Catalyst

This example demonstrates the usefulness of acidic catalysts in preparing lignocellulosic materials for board making. A sulfuric acid solution of 0.4% was added to fresh sugarcane bagasse containing 49% moisture. The bagasse was treated at a steam temperature of 120 degrees C. for 16 minutes. For comparative purposes, another batch of bagasse was treated with the same steaming temperature and time as the first batch of bagasse, but without the addition of sulfuric acid. After the steam treatment, the bagasse was dried to a moisture content of 5%. One board of 18×18×7/16 inches with a specific gravity of 0.77 (48 pcf) was made from each batch of bagasse, using one press condition, press temperature of 220 degrees C., pressure of 300 psi and press time of 10 minutes. The results are listed as follows:

With Acid
MOR: 3200 psi, wet MOR: 1880 psi
IB: 87 psi
MOE: 635 000 psi
Swelling after 2 hrs boiling: 11.5%

Without Acid
MOR: 1470 psi, wet MOR: psi
MOE: 338 000 psi
Swelling after 2 hrs boiling: Disintegrated The higher mechanical strength and lower thickness swelling of the board made from the acid treated bagasse was mainly due to the higher proportion of the free sugars, furfurals and other decomposition products generated from the hemicellulose. Chemical analysis indicated that the acid treated bagasse contained 16.5% water solubles and the control contained only 7.3%.

EXAMPLE 9

Densified Fuel Pellets

This example demonstrates the making of waterproof densified solid fuel pellets from saw mill residues which contained about 70% wood and 30% bark by weight. These residues were made up from softwood species of pine, spruce and fir with a moisture content of about 40%. They were first chipped in order to be able to pass through a ¼ inch screen, dried to a moisture content of less than 10%, and then given a steam treatment at 230 degrees C. for 3 minutes. The treated material was extruded continuously from the treating vessel at the end of the steaming, and was immediately fed to a heated extrusion machine in such a way that a minimum amount of heat was lost.

After extrusion, a waterproof solid pellet (3 inches in length and 1 inch in diameter) was obtained. These pellets had a specific gravity of 1.2 and did not disintegrate in boiling water. After a long period of outdoor storage, the weathered pellet retained good handling properties and combustion characteristics.

EXAMPLE 10

MDF from Thermo-Mechanically Treated Fibers

This sample discloses the use of thermal mechanically treated softwood fibers which were subjected to a pressurized steam and defibrization. Mixed fiber furnishes of pine and spruce were obtained from a Canadian hardboard plant. The fibers were produced from chips which has been cooked under steam pressure at about 180 degrees C. for 2 minutes and passed through a Bauer disc refiner. The fiber furnish contained about 72% moisture and was divided into two equal parts. One part was dried to a moisture content of about 3%. The other part was subjected to a high pressure steam treatment at 210 degrees C. for 10 minutes. After steam treatment, the fiber furnish was dried to about 3%. M.C. These two furnishes of mixed softwood fibers were processed under identical conditions for the fabrication of 2 one-half inch thick medium density fiberboards with a 52 pcf density. The press temperature was 220 degrees C. and the press time was 10 minutes. However, only 250 psi pressure was applied to the mat made from steam treated fibers while 400 psi was required to press the mat made from original fiber furnish in order to obtain a similar press closing rate. Test results are summarized in the following statistics:

| MDF (original fibres) | MDF (steam treated fibres) |
|---|---|
| MOR: (dry) 1820 psi | 3980 psi |
| (boiled) 0 (test specimen disintegrated in water) | 1950 psi |
| IB: 32 psi | 127 psi |

Chemical analysis indicated that the original hard board fiber stock contained about 4.3% water solubles, while the steam treated stock contained approximately 14.6% water solubles.

EXAMPLE 11

This example demonstrates the extraction of the water solubles from the steam treated lignocellulosic materials and processed into a thermosetting resin adhesive for bonding.

Six Kg of poplar saw dusts, including about 14% bark, with a moisture content of 27% were treated with steam at 240 deg. C. for 90 seconds. The treated saw dusts were soaked with 20 liters of hot water and left overnight. The water was drained from the saw dusts and then evaporated under vacuum to a concentration of about 50% solids. The concentrated liquor was dark brownish in colour with a pH of 3.9 and a viscosity of 2.3 poise. Total solids by weight of the concentrated liquor was 0.5.9 Kg, or about 12.5% of the original saw dusts. This liquor was ready as a thermosetting resin adhesive.

Commercial dry wafers were sprayed with 5% solids by weight of the liquor resin adhesive based on the O.D. weight of wafers. The resin coated wafers were dried to a moisture content of 3-4% for board making. Three panels of 18×18×7/16 inch were made to three different targeted densities of 38, 40, and 42 pcf. One press condition with temperature of 230 deg. C., 400 psi pressure and 12 minutes press time was used. Test results of these three waferboards are listed below:

| BOARD | DENSITY (pcf) | MOR (psi) DRY | WET | MOE (1000) | IB |
|---|---|---|---|---|---|
| 1 | 38.3 | 2780 | 1450 | 598,000 | 64 |
| 2 | 40.5 | 3440 | 1760 | 673,000 | 92 |
| 3 | 42.2 | 3670 | 1920 | 764,000 | 113 |
| CSA STANDARD | — | 2500 | 1250 | 400,000 | 50 |

In the other embodiments the concentrated liquid is converted into a solid thermoset, water-proof resin adhesive.

EXAMPLE 12

White spruce and Jack pine saw mill residues containing about 7% bark material and 16% moisture content were hammer milled to pass a 6.4 mm (¼ inch) screen and then were treated with various steam temperature for different durations. A total of 15 batches of residues were treated at 4 different high pressure steams with temperatures ranging from 215° C. to 260° C. for a duration of ½ to 11 minutes. After steaming, the treated mill residue was washed with warm water and the elute was evaporated under vacuum to a concentration of about 50% solids as a liquid resin adhesive. The liquid resin adhesive was dark brown in color with a pH ranging from about 2.8 to 4.3. The liquid resin had a low viscosity which made it easy to spray.

Poplar wafers (approximately 38 mm length, 0.7 mm thickness and 6 to 50 mm width) were sprayed with 6% liquid adhesive (solids based on O.D. wafer weight). After spraying, the wafers were dried to a moisture content of about 3-5% before forming the mat. A total of 38 waferboards (60×60×1.11 cm) with a density of about 660 kg/m³ were made with one pressing condition (230° C. temperature, 12 minutes time and 35 kg/cm² closing pressure). Test results are summarized in the following Table 1. CSA Standard CAN-04370-M86 is included for comparison.

TABLE 1

| RESIN TREATMENT Temp & Time | BOARD DENSITY Kg/M³ | MOR (MPa) DRY | BOILED | MOE (GPa) | IB (kPa) | THICKNESS SWELLING (%) |
|---|---|---|---|---|---|---|
| 260 deg C. at | | | | | | |
| ½ min | 660 | 17.3 | 4.8 | 5.12 | 370 | 8.7 |
| 1 min | 650 | 21.6 | 9.5 | 5.84 | 430 | 3.5 |
| 1.½ | 670 | 22.3 | 12.4 | 5.88 | 485 | 2.6 |
| 245 deg C. at | | | | | | |
| 1 min | 650 | 18.4 | 7.2 | 5.27 | 380 | 7.8 |
| 2 min | 670 | 19.6 | 9.4 | 5.17 | 480 | 4.2 |
| 3 min | 650 | 22.8 | 11.4 | 5.42 | 560 | 2.9 |
| 230 deg C. at | | | | | | |
| 1 min | 660 | 18.2 | 0 | 4.27 | 130 | — |

TABLE 1-continued

| RESIN TREATMENT Temp & Time | BOARD DENSITY Kg/M³ | MOR (MPa) DRY | MOR (MPa) BOILED | MOE (GPa) | IB (kPa) | THICKNESS SWELLING (%) |
|---|---|---|---|---|---|---|
| 3 min | 670 | 21.9 | 8.9 | 5.76 | 330 | 6.6 |
| 5 min | 660 | 23.4 | 8.8 | 5.62 | 555 | 6.3 |
| 7 min | 660 | 24.1 | 13.3 | 5.86 | 530 | 2.8 |
| 9 min | 660 | 23.4 | 11.6 | 5.58 | 555 | 2.7 |
| 215 deg C. at | | | | | | |
| 5 min | 640 | 16.2 | 0 | 5.05 | 190 | — |
| 7 min | 630 | 19.8 | 0 | 5.11 | 300 | — |
| 9 min | 650 | 21.7 | 6.7 | 5.20 | 390 | 10.6 |
| 11 min | 650 | 22.4 | 9.8 | 5.46 | 580 | 5.3 |
| CSA STANDARD CAN3-0437.0-M86 | | 17.2 | 8.6 | 3.10 | 345 | 25% |

EXAMPLE 13

This example shows the particle size and shape of the feed material in relation to quality of the thermosetting resin adhesive produced. Fresh poplar chips with about 25% moisture content were divided into two equal parts A & B. However, chips of part B were hammer milled to pass a 6.4 mm screen before steam treatment. Both parts A & B were then treated with high pressure steam at 230 deg. C. for 3 minutes. Liquid resin adhesive was extracted and concentrated separately from the treated poplar chips and particles. Two batches of 6 waferboards were fabricated with resin adhesives extracted from poplar wood A & B under identical conditions. The following Table 2 shows the test results which indicate that resin adhesive extracted from hammer milled poplar particles was better than that extracted from poplar chips of the same origins, and processed under the same manufacturing conditions.

TABLE 2

Summary of waferboards bonded with 6% resin adhesives extracted from poplar chips and poplar particles

| RESIN TREATMENT Temp & Time | BOARD DENSITY Kg/M³ | MOR (MPa) DRY | MOR (MPa) BOILED | MOE (GPa) | IB (kPa) | THICKNESS SWELLING (%) |
|---|---|---|---|---|---|---|
| 230 deg C. at 3 minutes | | | | | | |
| CHIPS | 650 | 19.8 | 8.7 | 5.30 | 445 | 4.2 |
| PARTICLES | 670 | 23.4 | 11.8 | 6.00 | 560 | 3.5 |

(Press temperature: 230 deg C., Press time: 10 min)

EXAMPLE 14

This example demonstrates the use of tree bark for the extraction of resin adhesive. Fresh white pine bark with about 12% wood material containing about 53% moisture content was hammer milled to pass a 6.4 mm screen and was then treated with high pressure steam at 230 deg. C. for 5 minutes. About 16% liquid solids resin by weight of O.D. bark was extracted from the steam treated bark and was concentrated to a liquid resin with 48% solids. The bark resin was dark brown in colour with a pH of 3.2. These homogeneous particleboards with 8% resin solids were fabricated and hot pressed at 230 deg. C. under a pressure of 40 kg/cm² for ten minutes. Test results are listed in the following Table 3.

TABLE 3

| RESIN TREATMENT Temp & Time | BOARD DENSITY Kg/M³ | MOR (MPa) DRY | MOR (MPa) BOILED | MOE (GPa) | IB (kPa) | THICKNESS SWELLING (%) |
|---|---|---|---|---|---|---|
| 230 deg C. for 5 min | 620 | 12.6 | 4.6 | 2.87 | 580 | 5.7 |
| | 670 | 15.2 | 6.8 | 3.37 | 720 | 4.4 |
| | 710 | 19.3 | 8.2 | 3.95 | 810 | 3.2 |

EXAMPLE 15

This example demonstrates the extraction of resin adhesive from agricultural residue of sugarcane bagasse, a pulpy residue after sucrose was extracted from cane sugar production. The bagasse, containing about 14% moisture content was treated with high pressure steam at 220 deg. C. for 7 min. About 12% resin solids by weight of O.D. bagasse was extracted and concentrated to a liquid adhesive with a solids content of about 52%. Dried bagasse fibers were sprayed with 8% of the liquid adhesive and pressed at 230 deg. C. for 10 minutes to form homogeneous particleboards (600×600×12.5 mm) with various densities. Test results of 3 bagasse particleboards are summarized in the following Table 4.

TABLE 4

Summary of bagasse particleboards bonded with 8% adhesive extracted from sugarcane bagasse.

| RESIN TREATMENT Temp & Time | BOARD DENSITY Kg/M³ | MOR (MPa) DRY | MOR (MPa) BOILED | MOE (GPa) | IB (kPa) | THICKNESS SWELLING (%) |
|---|---|---|---|---|---|---|
| 220 deg C. for 7 min | 670 | 15.7 | 7.1 | 4.76 | 375 | 5.7 |
|  | 730 | 19.3 | 9.6 | 5.12 | 460 | 5.2 |
|  | 800 | 22.6 | 12.3 | 5.60 | 590 | 3.9 |

EXAMPLE 16

This example illustrates the use of another agricultural by-product, wheat straw, as raw material for the production of the thermosetting adhesive. Dry wheat straw was chopped to about 20 cm in length and then treated with high pressure steam at 220 deg. C. for 2 minutes. About 14% water solubles by weight of straw was extracted and concentrated to about 49% solids as liquid adhesive.

Fine spruce particles of less than 2 mm were sprayed with 10% of the liquid adhesive. Larger particles, between 2 mm to 6 mm, were sprayed with 8% solids of the liquid adhesive. Three particleboards (600×600×12.5 mm) of 3-layer construction were formed with fine particles in the surface layers and coarse particles in the core. All boards were targeted to a density of 770 kg/M³ and hot pressed at 230 deg. C. for 8, 10 and 12 minutes respectively. Test results are summarized in the following Table 5.

TABLE 5

| PRESS TIME (min) | BOARD DENSITY Kg/M³ | MOR (MPa) DRY | MOR (MPa) BOILED | MOE (GPa) | IB (kPa) | THICKNESS SWELLING (%) |
|---|---|---|---|---|---|---|
| 8 min | 770 | 18.2 | 0 | 3.26 | 280 | — |
| 10 min | 780 | 21.3 | 7.6 | 4.42 | 485 | 4.5 |
| 12 min | 780 | 22.6 | 9.7 | 5.16 | 620 | 3.6 |

EXAMPLE 17

Fresh birch chips containing about 7% bark material and about 70% moisture content were treated with high pressure steam of 230 deg. C. for 5 minutes. The chips were washed with water twice and squeezed to extracted as much elute as possible. The elute was evaporated under vacuum to a concentrate containing about 30% solids as liquid adhesive which was freeze dried to a solid state. The solid adhesive was crushed and then ball milled overnight to a fine powder (passed 300 mesh screen). Poplar wavers were first sprayed with 1% molten slack wax and followed with 4% resin powder. Three waferboards were made with the powdered adhesive at a press temperature of 230 deg. C. under a pressure of 35 kg/cm² for three different press times of 8, 10, and 12 minutes. Test results of these 3 waferboards are listed below in Table 6.

TABLE 6

| PRESS TIME | BOARD DENSITY Kg/M³ | MOR (MPa) DRY | MOR (MPa) BOILED | MOE (GPa) | IB (kPa) | THICKNESS SWELLING (%) |
|---|---|---|---|---|---|---|
| 8 min | 660 | 16.2 | 0 | 4.78 | 390 | — |
| 10 min | 670 | 22.0 | 10.9 | 5.38 | 570 | 5.6 |
| 12 min | 660 | 22.8 | 11.0 | 5.61 | 630 | 3.7 |

EXAMPLE 18

This example illustrates the use of low steam temperature in combination with an acid catalyst to hydrolyze the hemicellulose into water soluble carbohydrates resin material from mixture of aspen and spruce wood at about equal proportion by chip weight.

Fresh mixture of aspen and spruce chips were divided into two batches. One batch was soaked in a 0.4% solution of sulfuric acid for 24 hours and then steamed at 150 deg. C. for 25 minutes. The other batch, without the addition of acid was further divided into 3 groups and each group was also steamed at 150 deg. C. for 60, 120 and 180 minutes respectively. Water solubles were extracted from the two treated batches of aspen and spruce mixed chips and concentrated to about 46% solids as resin material. Before use for waferboard bonding, the liquid resin adhesive obtained from acid catalyzed chips was adjusted with sodium hydroxide to a pH level of 3.0. Twelve waferboards were fabricated with four resin adhesives derived from the two batches of chips. Resin content for all waferboard was 6%. Press temperatures was 230 deg. C. and press time was 12 minutes. Test results are summarized in the following Table 7.

TABLE 7

| STEAM TREATMENT | BOARD DENSITY Kg/M³ | MOR (MPa) DRY | MOR (MPa) BOILED | MOE (GPa) | IB (kPa) | THICKNESS SWELLING (%) |
|---|---|---|---|---|---|---|
| Poplar chips treated at 150 deg C. for 40 min | 660 | 16.2 | 0 | 3.23 | 380 | — |

TABLE 7-continued

| STEAM TREATMENT | BOARD DENSITY Kg/M³ | MOR (MPa) DRY | MOR (MPa) BOILED | MOE (GPa) | IB (kPa) | THICKNESS SWELLING (%) |
|---|---|---|---|---|---|---|
| 120 min | 650 | 19.3 | 4.8 | 3.76 | 430 | 10.8 |
| 180 min | 660 | 22.7 | 11.6 | 4.95 | 570 | 5.2 |
| Poplar chips treated at 150 deg C. with H₂SO⁴ for 25 min | 660 | 23.4 | 12.8 | 516 | 590 | 3.2 |

EXAMPLE 19

This example shows the extraction of water soluble resin material from previously hydrolyzed lignocellulosic material which contained mainly cellulose, i.e. hemicellulose had previously been hydrolyzed and removed from the lignocellulosic material.

The poplar particle residue processed in Example 13, after being treated with high pressure steam (240° C. for 90 seconds) and after the water solubles from the hydrolyzed hemicellulose being extracted, was sprayed with a diluted sulfuric acid solution. The acid content of the residue was about 1.2% based on O.D. weight of the residue. The acid laden residue was steamed at 210 deg. C. for 14 minutes to cause hydrolysis of the cellulose to yield water soluble resin material. About 32% water solubles by O.D. weight of the lignocellulose residue was obtained. The liquid resin was adjusted with soluble base of NaOH to a pH of 3.0 before being concentrated as liquid resin adhesive with a solids content of about 48%.

Three poplar waferboards were made with 6% spray of the liquid resin adhesive. Test results are summarized in the following Table 8.

TABLE 8

| PRESS TIME | BOARD DENSITY Kg/M³ | MOR (MPa) DRY | MOR (MPa) BOILED | MOE (GPa) | IB (kPa) | THICKNESS SWELLING (%) |
|---|---|---|---|---|---|---|
| 230 deg C. for | | | | | | |
| 8 min | 660 | 22.6 | 8.9 | 4.26 | 490 | 8.6 |
| 10 min | 650 | 23.3 | 11.2 | 5.33 | 555 | 5.2 |
| 12 min | 650 | 23.8 | 13.3 | 5.57 | 630 | 3.7 |

EXAMPLE 20

This example illustrates the versatility of the process in that both thermosetting adhesive and composite panel products can be produced from the same lignocellulosic material after the steam treatment.

Green poplar chips were treated with high pressure steam at 245 deg. C. for 90 seconds. After the steam treatment, about 6% water solubles by O.D. weight of chips was extracted with hot water elute, concentrated to about 50% solids content and was used as a resin adhesive for making waferboard. The residual chips were then mixed with 20% mildly steamed green poplar chips and refined with a disc refiner to produce fibers for manufacture of medium density fiberboard. No adhesive was added to the fibers as there was enough resin material remaining in the steam treated fiber material for bonding. Test results for waferboards and MDF are summarized in the following Table 9.

TABLE 9

| PRESS TIME | BOARD DENSITY Kg/M³ | MOR (MPa) DRY | MOR (MPa) BOILED | MOE (GPa) | IB (kPa) | THICKNESS SWELLING (%) |
|---|---|---|---|---|---|---|
| WAFERBOARD: 6% Resin Adhesive | | | | | | |
| 230 deg C. at 12 min | 660 | 21.1 | 8.9 | 5.62 | 530 | 4.3 |
| MDF: 0% resin addition | | | | | | |
| 230 deg C. at 12 min | 800 | 22.6 | 11.8 | 4.96 | 650 | 5.7 |

EXAMPLE 21

This example shows the use of a mixture of water soluble resin material derived from hemicellulose and cellulose of poplar chips. The water soluble resin adhesives collected from Examples 13 (240° C. 90 seconds) and 19 were mixed at a ratio of 1:1 based on resin solids weight. Waferboards (11 mm) made with t is mixed resin adhesives derived separately from hemicellulose and cellulose of poplar chips possessed very similar physical properties to those waferboards bonded with water soluble resin derived from hemicellulose and cellulose respectively. Test results are shown in Table 10 below.

TABLE 10

| Treatment | Density (Kg/M³) | Press Time (min) | MOR (MPa) Dry | MOR (MPa) Wet | MOE (GPa) | IB (MPa) | Thick Swell (%) | Linear Expans (%) |
|---|---|---|---|---|---|---|---|---|
| 6% | 583 | 10 | 19.1 | 8.9 | 4.647 | 0.368 | 7.8 | 0.21 |

TABLE 10-continued

| Treatment | Density (Kg/M³) | Press Time (min) | MOR (MPa) Dry | MOR (MPa) Wet | MOE (GPa) | IB (MPa) | Thick Swell (%) | Linear Expans (%) |
|---|---|---|---|---|---|---|---|---|
| Mixed | 648 | 10 | 23.4 | 12.6 | 5.876 | 0.516 | 6.5 | 0.22 |
| Resin | 711 | 10 | 30.5 | 16.5 | 6.426 | 0.724 | 6.0 | 0.19 |
| Canadian Standard CAN3-0437.0-M86 Minimum | | | 17.2 | 8.6 | 3.100 | 0.345 | 25.0 | 0.40 |

I claim:

1. Process for converting hemicellulose of lignocellulosic material into a thermoset, water proof adhesive, comprising:
   (a) bringing lignocellulosic material in divided form and containing at least 10% hemicellulose, rapidly into contact with high pressure steam at a temperature high enough to release the hemicellose without carbonization thereof;
   (b) maintaining the lignocellulosic material in contact with high pressure steam for a time sufficient only for the non-catalytic decomposition and hydrolization of hemicellulose into essentially low molecular weight, water soluble resin material selected from the group consisting of pentose and hexose sugars, sugar polymers, dehydrated carbohydrates, furfural products, organic acids and other minor decomposition products, with negligible carbonization of the hemicellulose and negligible degradation of cellulose;
   (c) heating and pressing the water soluble resin materials thus produced in a concentrated form against a surface to be adhered thereto, at a temperature, time and pressure sufficient to polymerize, cross link and thermoset this material into a water proof adhesive adhering to the surface.

2. A process for converting hemicellulose of lignocellulosic material into a thermoset, water-proof adhesive, comprising;
   (a) bringing lignocellulosic material, in divided form and containing at least 10 percent hemicellulose, rapidly into contact with high pressure steam at a temperature T (°C.) in the range 160° C. to 260° C.,
   (b) maintaining the lignocellulosic material in contact with the high pressure steam only for a time t (S) seconds in the range according to the formula $t_{(s)} - 10^{8.5836 - 0.02801 T(°C.)}$
   whereby the temperature is high enough to release the hemicellulose, does not exceed the temperature for carbonization thereof, and, in combination with the limited treatment time t (S) is only capable of non-catalytic decomposition and hydrolyzation of hemicellulose into water soluble resin material selected from the group consisting of pentose and hexose sugars, sugar polymers, dehydrated carbohydrates, furfural products, organic acids and other minor decomposition products, with negligible degradation of cellulose having taken place,
   (c) heating and pressing the water soluble resin material thus produced in a concentrated form, against a surface to be adhered thereto, at a temperature of at least 160° C. and for a sufficient time and pressure to polymerize, crosslink and thermoset this material into a waterproof adhesive adhering to the surface.

3. A process according to claim 1, wherein,
   (d) the lignocellulosic material, alone or in combination with other lignocellulosic material, in particle, fiber or flake form, containing the water soluble resin material from step (b) is concentrated, as soon as possible, by being dried to a low moisture content to prevent fermentation of the water soluble resin, then
   (e) the dried lignocellulosic material, alone or in combination with other lignocellulosic material is formed into a mat, and then
   (f) the mat is pressed in step (c) at a temperature in the range 160° C. to 250° C. to avoid charring the mat, and at a pressure and time sufficient, to first polymerize the water soluble resin into the said crosslinked polymeric substance, and thermoset the thus formed polymeric material into the water-proof adhesive, thereby bonding in situ the other components of the lignocellulosic material as the said surface to be ad ere to and forming a bonded, composite product.

4. A process according to claim 1, wherein the lignin portion of the lignocellulosic material is also decomposed and hydrolyzed into low molecular weight lignin and lignin products.

5. A process according to claim 1, wherein the hydrolyzed lignocellulosic material contains less then 30 percent by weight, of low molecular weigh t water solubles selected from the group consisting of sugars, sugar polymers, dehydrated carbohydrates, furfural products, organic acids, lignin, lignin products and other minor decomposition products.

6. A process according to claim 1, wherein the lignocellulosic material is brought into contact with the high pressure steam in a pressure vessel and, after maintaining the lignocellulosic material in contact with the high pressure steam for the time t (S) seconds, the steam pressure in the pressure vessel is released to atmospheric pressure with an explosive discharge to render the lignocellulosic material in fibrous and particulate form.

7. A process according to claim 1, wherein the lignocellulosic material is brought into contact with the high pressure steam in a pressure vessel and, after maintaining the lignocellulosic material in contact with the high pressure steam for the time t (S) seconds, the steam pressure in the pressure vessel is gradually brought to atmospheric pressure to retain the lignocellulosic material, other than the hemicullose and lignin, substantially in the original form.

8. A process according to claim 1, wherein the lignocellulosic material is brought into contact with the high pressure steam in a pressure vessel and, the steam pressure is maintained within the pressurized vessel while steam treated lignocellulosic material is continuously extruded from the pressure vessel to atmosphere in the time t (S) seconds.

9. A process according to claim 3, wherein the lignocellulosic material, after the high pressure steam treatment, is dried to a moisture content of less than 18 percent to avoid fermentation.

10. A process according to claim 1, wherein t e lignocellulosic material is at least one substance selected from the group consisting of stem, stalk, shrub, foliage, bark, root, shell, pod, nut, husk, fiber, straw, vine, grass, bamboo, reed and wood.

11. A process according to claim 1 or 3 wherein the lignocellulosic material in steps (a) and (e) is selected from the group consisting of particles, fibers, strands, wafers or flakes.

12. A process according to claim 2, wherein a portion of hemicellulose of the lignocellulosic material is removed from the lignocellulosic material before the lignocellulosic material is rapidly brought into contact with high pressure steam in step (a).

13. A process according to claim 1, wherein the lignocellulosic material of step (b) is expressed, or treated with water, to extract unpolymerized, water soluble resin material therefrom as an aqueous solution, water is evaporated from the aqueous solution to concentrate the water soluble resin material, and the concentrated, water soluble resin material is used in step (c).

14. A process according to claim 13, wherein the water is evaporated from the aqueous solution under vacuum.

15. A process of converting lignocellulosic materials into reconstituted composite products, comprising:
(a) bringing lignocellulosic material in divided form and containing at least 10 percent hemicellulose rapidly into contact with high pressure steam at a temperature high enough to release the hemicellulose without carbonization thereof, for a time sufficient only for the non-catalytic decomposition and hydrolization of hemicellulose into essentially low molecular weight, water soluble resin material selected from the group consisting of pentose and hexose sugars, sugar polymers, dehydrated carbohydrates, furfural products, organic acids and otter minor decomposition products with negligible carbonization of the hemicellulose and negligible degradation of cellulose;
(b) immediately drying the lignocellulosic material to a water content of less than about 18%;
(c) shredding the lignocellulosic material to a fibrous state and forming it into a mat;
(d) pressing the said mat using heat and pressure to transform the decomposed and hydrolyzed products of hemicellulose to provide a thermoset adhesive bond and to yield a reconstituted composite product without charring the mat.

16. A process as in claim 15 in which the time in which the lignocellulosic material remains in contact with the high pressure stream is a time t (S) seconds in the range defined by the formula:

$$t_{(s)} - 10^{8.5836 - 0.2801 T(°C)}.$$

17. A process as in claim 16, in which the temperature of the high pressure steam is in the range 160° C. to 260° C.

18. A process as in claim 17 in which the mat is pressed at a temperature of about 160° C. to 250° C. and at a pressure and time sufficient to first polymerize the water soluble resin into a cross-linked polymeric substance, and thermoset the thus formed polymeric material into a water proof adhesive, thereby bonding in situ the otter components of the lignocellulosic material and forming a bonded composite product.

19. A process as in claim 15 in which the lignin portion of the lignocellulosic material is also decomposed and hydrolized into low molecular weight lignin and lignin products.

20. A process as in claim 15 in which the hydrolized lignocellulosic material contains less than 30% by weight of said essentially low molecular weight water soluble resin material.

21. A process for converting lignocellulosic material into a thermoset resin material, comprising:
(a) bringing lignocellulosic material in divided form rapidly into contact with high pressure steam at a temperature high enough to decompose and hydrolyze hemicellulose contained in said lignocellulosic material without carbonization thereof;
(b) maintaining the lignocellulosic material in contact with high pressure steam for a time sufficient only for the decomposition and hydrolyzation of hemicellulose into low molecular weight, water soluble resin material selected from the group consisting of sugars, sugar polymers, furfural, dehydrated carbohydrate, organic acids and otter similar decomposition products, with negligible degradation of cellulose;
(c) separating out the water soluble resin material;
(d) bringing the remaining previously hydrolyzed lignocellulosic material in step (b) rapidly in contact with high pressure steam for a second time at a temperature high enough to decompose and hydrolyze cellulose without carbonization thereof;
(e) maintaining the previously hydrolyzed lignocellulosic material in contact with high pressure steam for a time sufficient for the decomposition and hydrolyzation of the cellulose into low molecular weight, water soluble resin material selected from the group consisting of hexose sugars, sugar polymers, hydroxymethyl furfural, organic acids and otter decomposition products;
(f) separating out the water soluble resin material from the hydrolyzed lignocellulosic material into the water soluble resin material and the hydrolyzed lignocellulosic residue;
(g) heating and pressing the water soluble material thus produced in steps (c) and (f) in concentrated form against a surface to be adhered thereto, at a temperature, pressure and for a time sufficient to polymerize, crosslink and thermoset this material into a waterproof adhesive bond adhering to the surface.

22. A process for converting hemicellulose of lignocellulosic material into a thermoset, water-proof resin adhesive, comprising:
(a) bringing lignocellulosic material, in divided form rapidly into contact with high pressure steam at a temperature in the range of 150° C. to 260° C.;
(b) maintaining the lignocellulosic material in contact with the high pressure steam only for a time sufficient to decompose and hydrolyze hemicellulose into low molecular weight, water soluble resin material selected from the group consisting of pentose and hexose sugar, sugar polymers, dehydrated carbohydrate, furfural, organic acids and otter decomposition products, with negligible degradation of cellulose having taken place;
(c) heating and pressing the water soluble resin material thus produced in a concentrated form, against a surface to be adhered thereto, at a temperature of at least 160° C. and for a sufficient time and pressure to polymerize, crosslink and thermoset this material into a waterproof adhesive bond adhering to the surface.

23. A process for converting cellulose of lignocellulosic material into a thermoset, water-proof resin adhesive, comprising:
   (a) bringing lignocellulosic material, which as been treated with high pressure steam to decompose and hydrolyze hemicellulose and from which the water soluble resin material has been extracted, rapidly into contact with high pressure steam at a temperature in the range of 150° C. to 260° C.;
   (b) maintaining the lignocellulosic material in contact with the high pressure steam for a time sufficient to decompose and hydrolyze cellulose into low molecular weight, water soluble resin material selected from the group consisting of hexose and pentose sugars, sugar polymers, dehydrated carbohydrate, furfural, organic acids and otter decomposition products;
   (c) heating and pressing the water soluble resin material thus produced in a concentrated form, against a surface to be adhered thereto, at a temperature of at least 160° C. and for a sufficient time and pressure to polymerize, crosslink and thermoset this material into a water-proof adhesive bond adhering to the surface.

24. A process of converting lignocellulosic material into reconstituted composite products, comprising:
   (a) bringing lignocellulosic material in divided form rapidly in contact with high pressure steam at a temperature high enough to decompose and hydrolyze hemicellulose without carbonization thereof, for a time sufficient for the decomposition and hydrolyzation of hemicellulose into low molecular weight, water soluble resin material selected from the group consisting of pentose and hexose sugars, sugar polymers, furfural, dehydrated carbohydrate, organic acids and otter decomposition products with negligible degradation of cellulose;
   (b) immediately drying and reducing, by, in either order, the lignocellulosic material into fiber or particulate to a moisture content of less than 18%;
   (c) forming the lignocellulosic material alone or in combination with otter lignocellulosic material in subdivided form into a mat;
   (d) pressing said mat, using heat and pressure to transform the decomposed and hydrolyzed products of hemicellulose to provide a thermoset adhesive bond to yield a reconstituted composite product without charring the mat.

25. A process according to claim 21, wherein,
   (h) the hydrolyzed lignocellulosic material, alone or in combination with otter lignocellulosic material, in particle, fiber or flake form, containing the water soluble resin material from steps (c) and (f) is concentrated, as soon as possible, by being dried to a low moisture content;
   (i) the dried lignocellulosic material, alone or in combination with otter lignocellulosic material is formed into a mat, and then
   (j) the mat is pressed at a high temperature to avoid charring the mat, at a pressure and for a time sufficient to first polymerize the water soluble resin material into the said crosslinked polymeric substance, and thermoset the thus formed polymeric material into the waterproof adhesive, t hereby bonding and bulking in situ the lignocellulosic material as the said surface to be adhered to and forming a bonded composite product.

26. A process according to claim 21, wherein the hydrolyzed lignocellulosic material containing 100% or less of water soluble resin material, in combination with otter lignocellulosic material, and in forms of particles, fibers or flakes from steps (b) and (e) is concentrated, as soon as possible, by being dried to a low moisture content, is formed into a mat, and then the mat is pressed at a temperature in the range of 160° C. to 250° C. to avoid charring the mat, and at a pressure and time sufficient to first polymerize the low molecular weight water soluble resin material into the said crosslinked, polymeric substance and thermoset the thus formed polymeric substance into the water-proof adhesive, t hereby bonding and bulking in situ the otter components of the lignocellulosic material as the said surface to be adhered to and forming a bonded composite product.

27. A process according to claim 21, wherein the water soluble resin material which is extracted from steps (c) and (f) and eluted with water from the decomposed and hydrolyzed lignocellulosic material, is processed into concentrated form.

28. A process according to claim 21, wherein the water soluble resin material obtained from the decomposition and hydrolization of hemicellulose and cellulose of the lignocellulosic material is used, separately or mixed together, as a thermosetting resin adhesive in liquid or solid form.

29. A process according to claim 21, wherein the water soluble resin materials derived from hemicellulose and cellulose of single or mixed species are used separately or in mixture.

30. A process according to claim 21, wherein the divided lignocellulosic material is mixed with an acidic catalyst in an amount of no more than 5% by weight before steam treatment to accelerate the thermal decomposition and hydrolyzation of hemicellulose and cellulose into water soluble resin material.

31. A process according to claim 21, wherein the lignocellulosic material is derived from forest and agricultural plants of woody or non-wood nature in a single or mixed species.

* * * * *